United States Patent
Yamamoto et al.

[11] Patent Number: 5,911,465
[45] Date of Patent: Jun. 15, 1999

[54] REAR SEAT ATTACHMENT APPARATUS FOR VEHICLE

[75] Inventors: Kazuhisa Yamamoto, Mission Viejo; Hideki Suzuki, Irvine, both of Calif.

[73] Assignee: Mazda Motor Corporation, Hiroshima, Japan

[21] Appl. No.: 08/925,073

[22] Filed: Sep. 8, 1997

[51] Int. Cl.⁶ ........................................... B60N 2/04
[52] U.S. Cl. ..................... 296/65.03; 296/65.15; 414/522; 414/537
[58] Field of Search .................... 296/63, 65.01, 296/65.03, 65.13, 65.15; 414/522, 537

[56] References Cited

U.S. PATENT DOCUMENTS

| | | | |
|---|---|---|---|
| 3,438,524 | 4/1969 | Snodgrass | 414/522 X |
| 5,046,913 | 9/1991 | Domek et al. | 414/522 |
| 5,393,192 | 2/1995 | Hall et al. | 414/537 |
| 5,443,239 | 8/1995 | Laporte | 248/503.1 |

FOREIGN PATENT DOCUMENTS 7-291003  11/1995  Japan .
8-300988  11/1996  Japan .

*Primary Examiner*—D. Glenn Dayoan
*Assistant Examiner*—Jason Morrow
*Attorney, Agent, or Firm*—Smith Patent Office

[57] ABSTRACT

A rear seat for a motor vehicle is attached detachably to a ramp member which is disposed on a floor panel such that the ramp member can slide on the floor in a longitudinal direction of the vehicle. Accordingly, when the rear seat needs to be removed from a vehicle compartment in order to make a large space or room for luggage or anything else, the ramp member carrying the rear seat thereon is drawn out of the vehicle. Then the rear seat can be removed to the outside using the ramp member. This makes the removal operation of the rear seat easy and can be performed without getting into the vehicle compartment and carrying the rear seat out of the vehicle compartment. Furthermore, it is also easy to load large sized luggage into the vehicle by putting it on the ramp member outside and then sliding the ramp member with the luggage into the vehicle compartment.

8 Claims, 14 Drawing Sheets

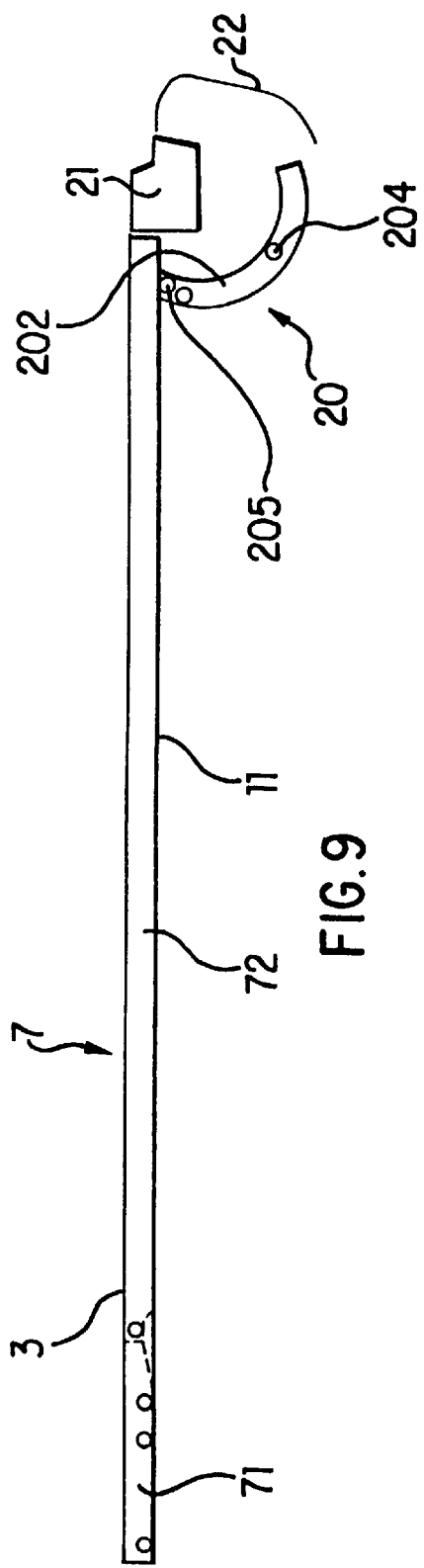
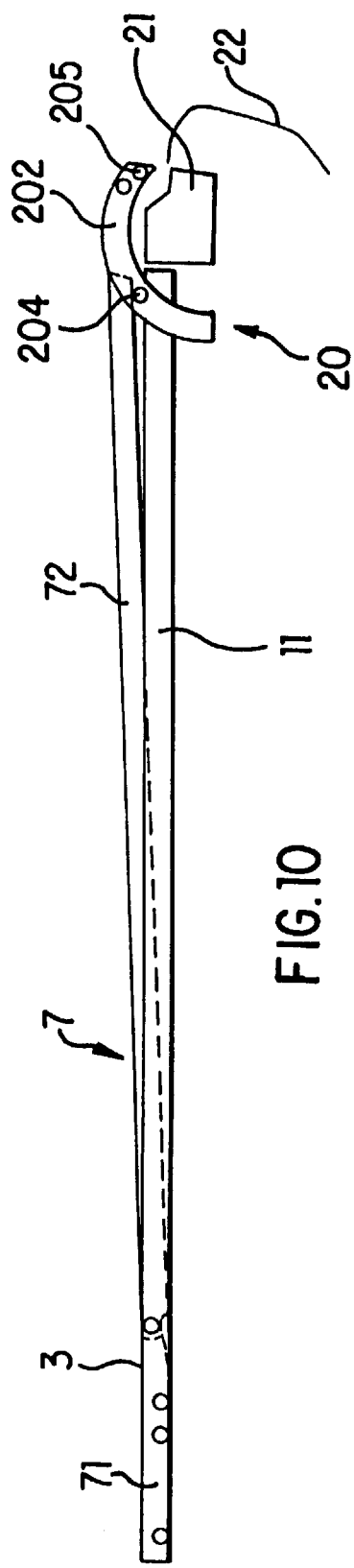

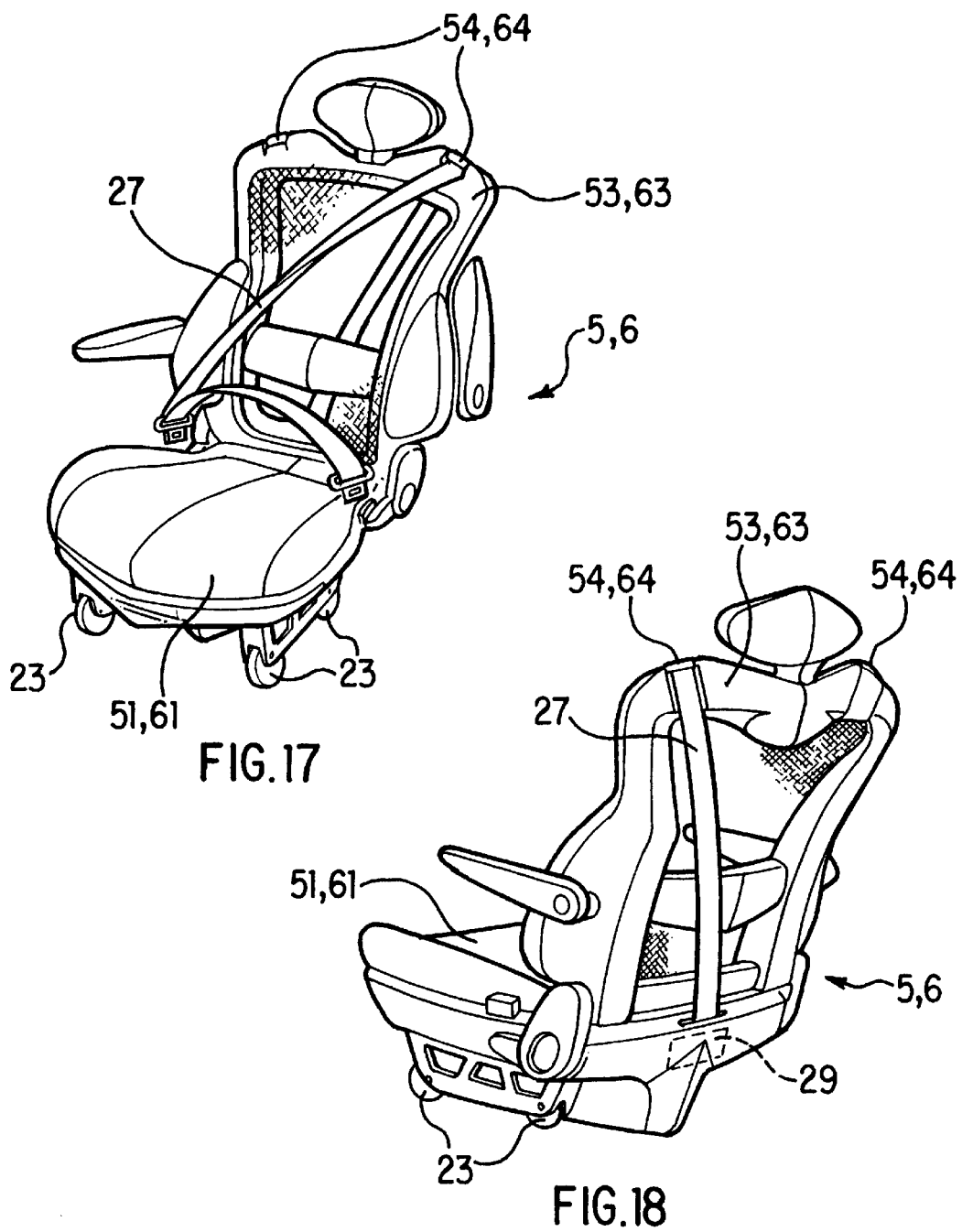

REAR SEAT ATTACHMENT APPARATUS FOR VEHICLE

BACKGROUND OF THE INVENTION

1. Field of the Invention

The present invention relates to a rear seat attachment apparatus for a vehicle. More particularly, the invention relates to a rear seat attachment apparatus in which a rear seat is attached detachably to a rear floor panel of a vehicle which has a rear lid covering rear part of its compartment.

2. Discussion of the Related Art

It is known that a rear seat is attached detachably to a floor panel of a vehicle so that a large luggage space can be made by removing the rear seat.

In general, this kind of detachable rear seat is arranged so that the seat moves along a guide rail fixed on the floor panel and is detached by means of a lock-unlock device disposed at the legs of the rear seat. Furthermore, in another type of known rear seat device, a rear seat is attached detachably to a floor panel by a lock-unlock device engaged with a hook fixed on the floor panel.

However, in these prior art devices when a large space or room for luggage or anything else is needed, a passenger needs to get in the vehicle compartment and carry the rear seats out of the vehicle compartment by unlocking the lock-unlock device thereof. It is rather troublesome for the passenger to get in the vehicle compartment and get out carrying rear seats, especially when there are many rear seats to be carried and the rear seats are relatively big and heavy.

SUMMARY OF THE INVENTION

The present invention has been made in consideration of the above problems of the conventional apparatus, and has as one of its objects to provide a rear seat attachment apparatus for a vehicle which makes removing and inserting the detachable rear seats simple and easy.

The aforesaid object and other objects of the invention are achieved by providing a rear seat attachment apparatus for a vehicle having a rear lid covering a rear part of a vehicle compartment, in which a rear seat is disposed on a floor panel of the rear part of the vehicle compartment. The rear seat attachment apparatus comprises a guide member disposed on the floor panel, a ramp member guided by the guide member so as to move adjacent to the floor panel in a longitudinal direction of the vehicle, and wherein the ramp member has a retracted position in the vehicle compartment and an extended position extending from the vehicle compartment, and a rear seat attached detachably to the ramp member.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements, and in which:

FIGS. 9, 10, 11, 12 and 13 are schematic side views showing a series of movement of the ramp member;

FIGS. 17 and 18 are perspective views of the rear seat according to the present invention.

DETAILED DESCRIPTION OF THE PREFERRED EMBODIMENTS

Preferred embodiments of the invention applied to a wagon type of motor vehicle will be explained in detail in accordance with the accompanying drawings.

Figure 1:
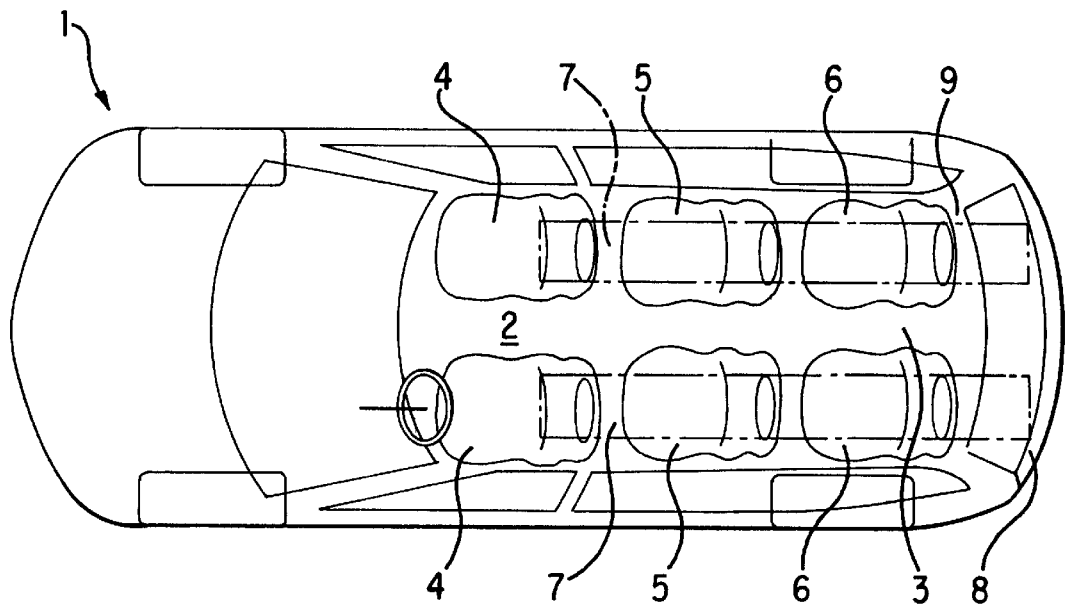
FIG. 1 is a plan view of a vehicle to which an embodiment of the invention is applied.
Figure 2:
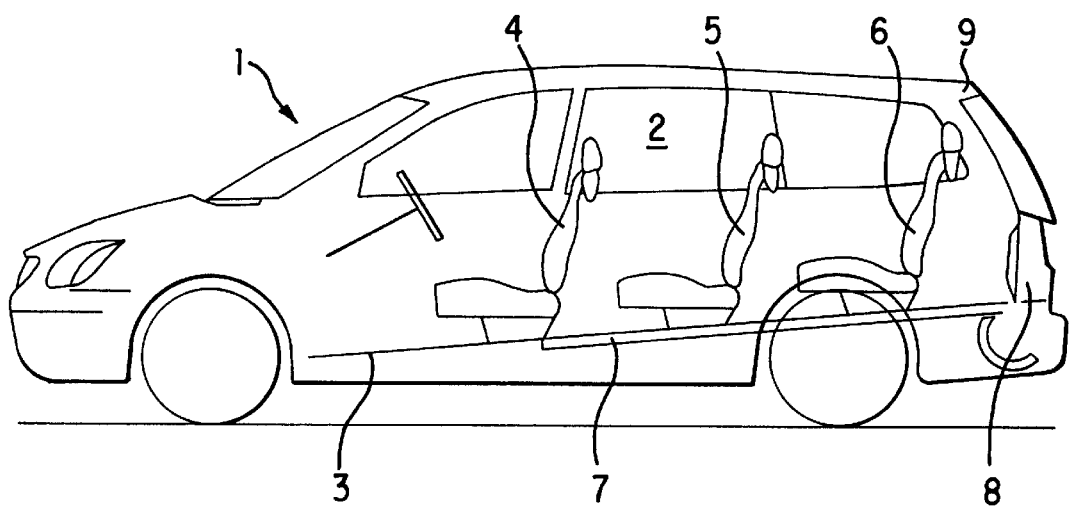
FIG. 2 is a side view of a vehicle to which an embodiment of the invention is applied.

As shown in FIGS. 1 and 2, front seats 4 and rear seats 5, 6 are disposed on a floor panel 3 in a compartment 2 of a wagon type of vehicle 1. The rear seats comprise middle-positioned seats 5 and rear-positioned seats 6. The rear seats 5, 6 are attached to ramp members 7 such that they can move along each of the ramp members 7. The ramp members 7 are also disposed on the floor panel 3 such that they can slide on the floor in a longitudinal direction of the vehicle. Numeral 8 denotes a rear lid which is attached pivotally to a rear end of a roof 9 forming an upper surface of the vehicle compartment 2.

Figure 3:
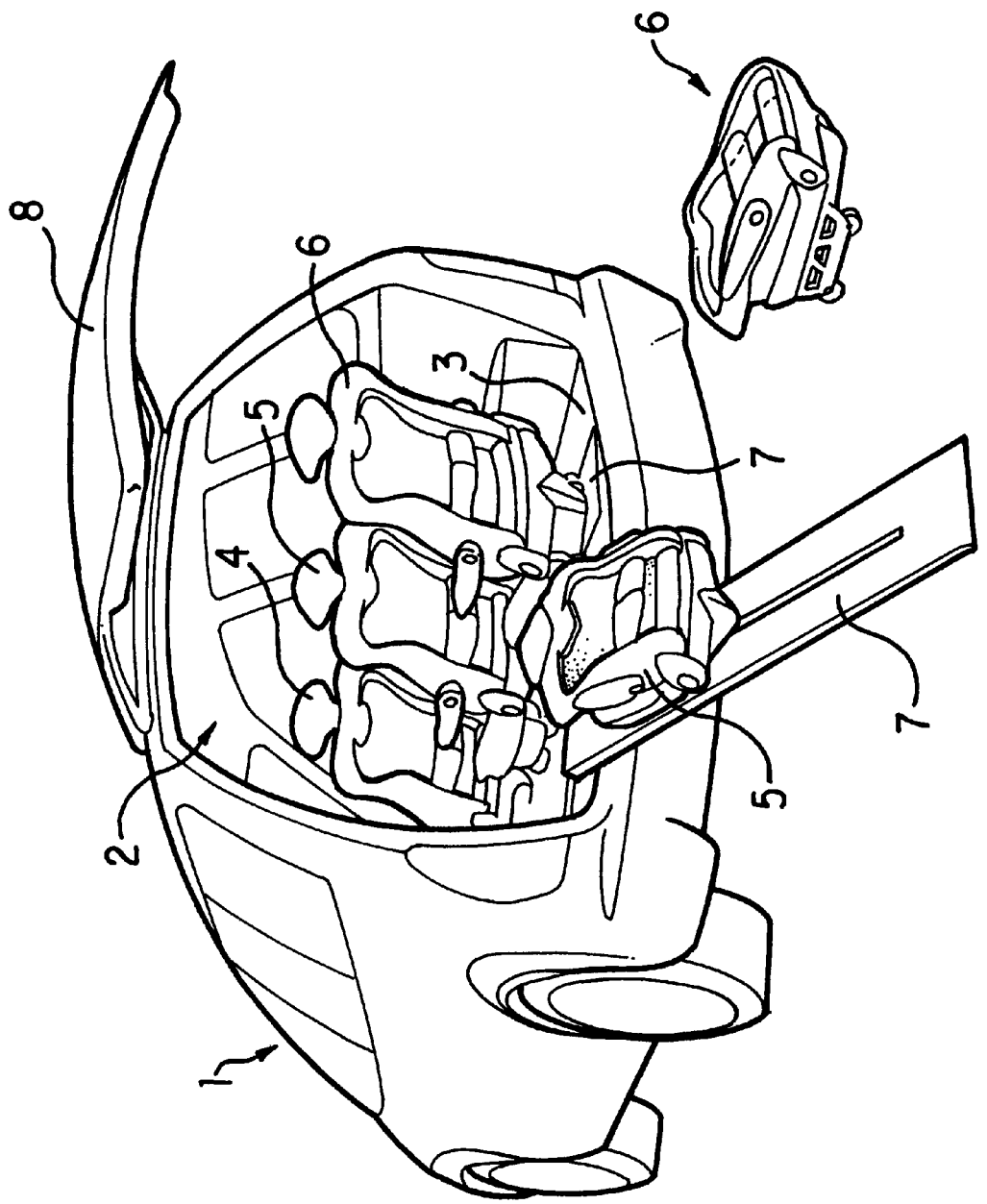
FIG. 3 is a perspective view of a vehicle to which an embodiment of the invention is applied.
Figure 4:
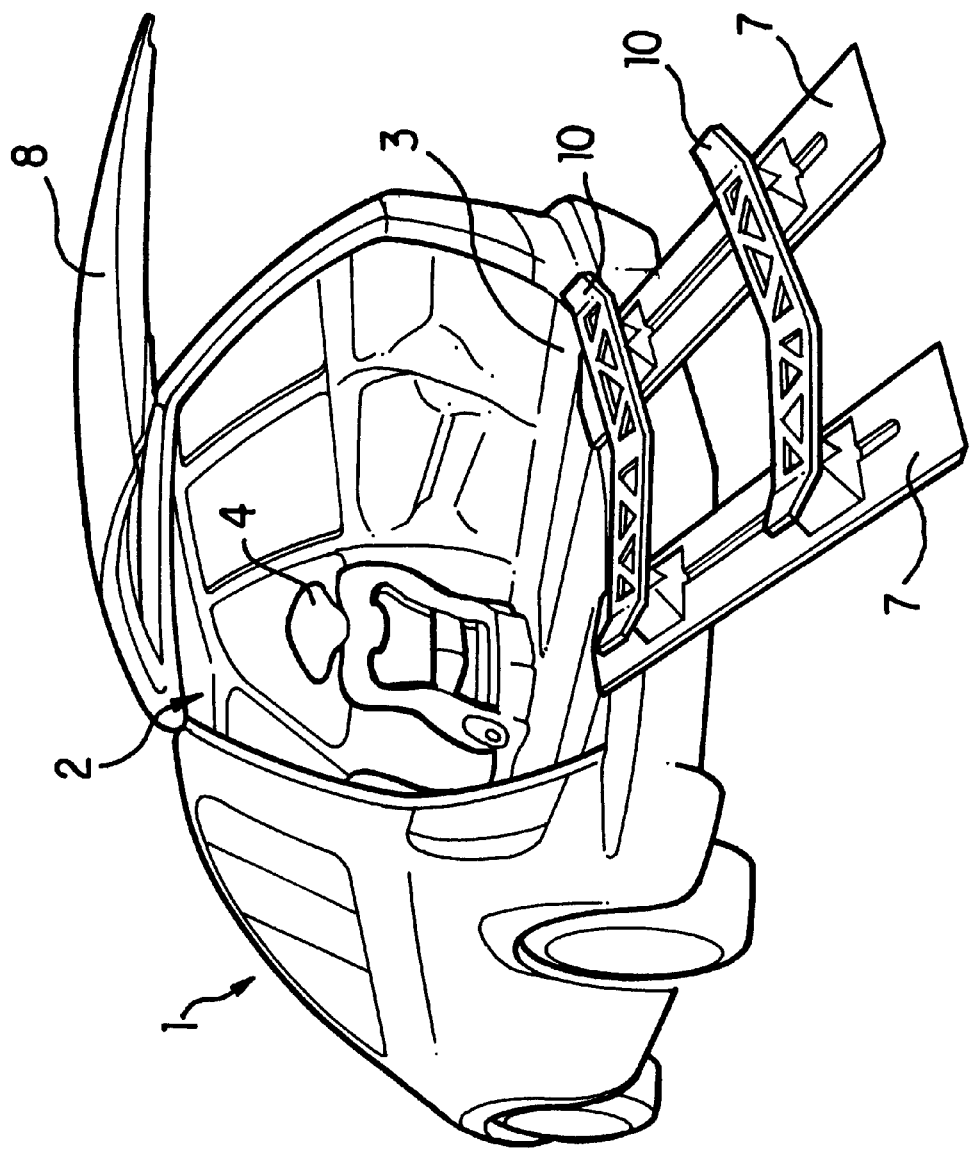
FIG. 4 is another perspective view of a vehicle to which an embodiment of the invention is applied.

FIGS. 3 and 4 show preferred forms regarding usage of the ramp member 7 related the rear seats 5, 6. In FIG. 3, the rear lid 8 is open and one ramp member 7 is drawn out of the vehicle compartment 2. The ramp member 7 drawn out has an inclined position and maintains its stable position when an end of the member touches the ground surface. The two ramp members 7 can be moved and drawn out independently. FIG. 3 shows a state in which the middle-positioned seat 5 is on the ramp member 7 which has been drawn out, and the rear-positioned seat is removed from the ramp member 7.

In accordance with this embodiment, as shown in these figures, when the rear seats 5, 6 need to be removed from the vehicle, the ramp member 7 is first drawn out of the vehicle compartment, then the seat is removed using the ramp member. This means that passengers do not need to get in and carry the heavy seats from the relatively narrow and small vehicle compartment.

In FIG. 4, both of the ramp members 7 are drawn out and all of the rear seats have been removed. Additionally, a pair of supporting members 10 is attached on the ramp members 7 lying over both members like a bridge. The supporting members may be useful when large luggage such as personal watercraft (i.e. a jet-water ski) is loaded into a space in the vehicle compartment made by removing the rear seats. That is, the supporting members are attached on each ramp member firmly and can support at least one piece of large luggage. The luggage can be loaded by pushing the ramp members 7 or the luggage itself into the compartment space along with the ramp members 7.

Figure 5:
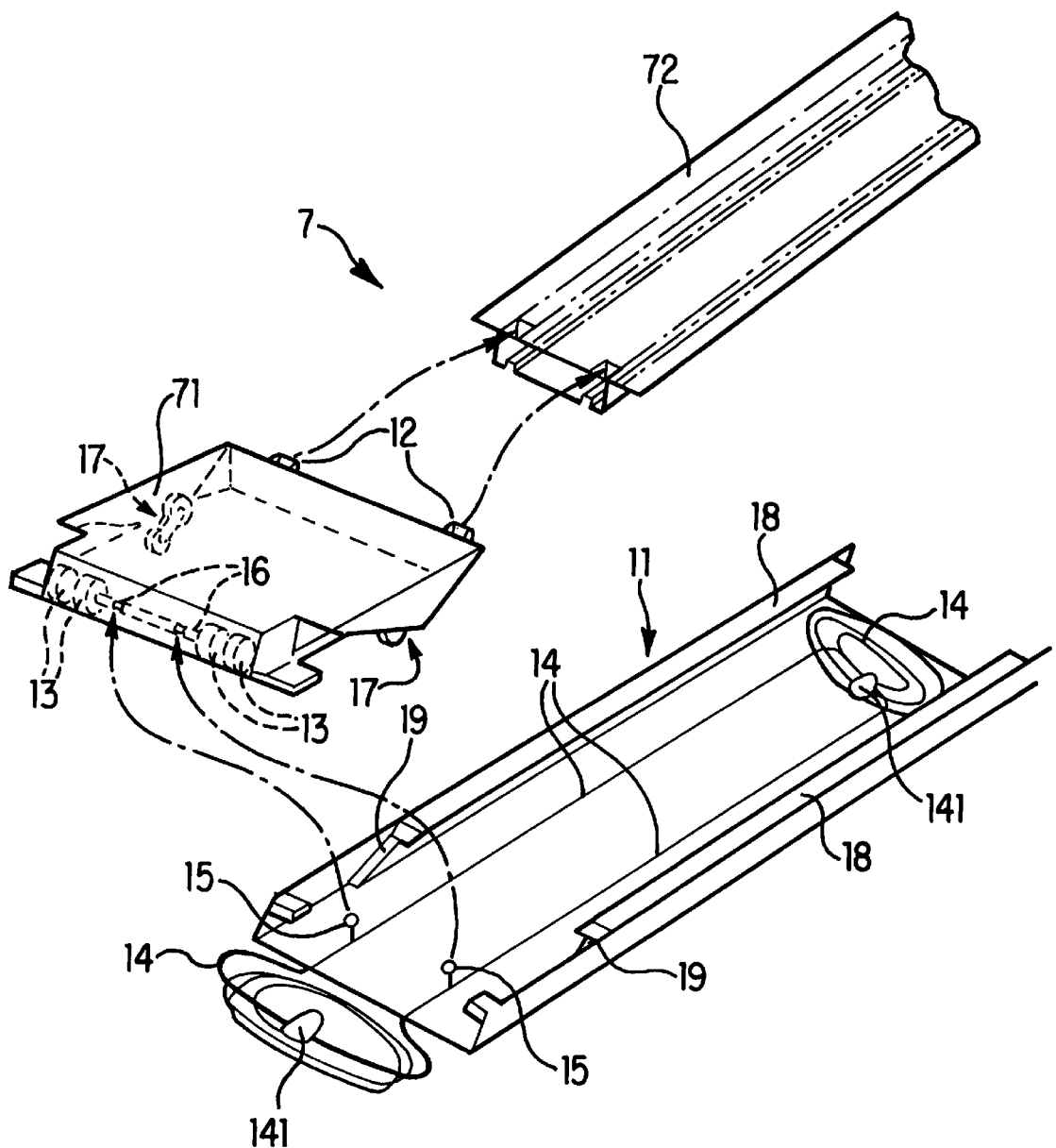
FIG. 5 is a expanded view of a ramp member according to the present invention.

In accordance with FIGS. 5 through 14, the structures of a guide rail 11 formed on a surface of the floor panel 3 and the ramp members 7 disposed in the guide rail 11 by means of an electrical drive mechanism will be described. FIG. 5 shows the ramp member 7 separated from the guide rail 11. Each ramp member 7, as shown in FIG. 5, comprises a front ramp member 71 and a rear ramp member 72. These two ramp members 71, 72 are connected to each other by a pivot mechanism 12. The front ramp member 71 has four rollers 13 disposed at both sides of its front end, and it has a connecting portion 16 connected to a drive hock 15 which is fixed to a driving cable 14 disposed in the guide rail 11. The drive hock 15 is a member that functions as a connector between the driving cable and the connecting portion 16. It has a shape or form that provides an engaged relationship.

Additionally, it includes a set of rollers 17 at both sides of its middle portion. Each roller set 17 is connected to the front ramp member 71 and has a pair of rollers which are disposed at a distance from each other. Meanwhile, the guide rail 11 is formed so that it has a U-shaped cross section, and it has guide surfaces 18 at both sides so that the set of rollers 17 runs on the guide surfaces 18.

In accordance with this structure, the front ramp member 71 can slide in the guide rail 11 through the driving cable 14 and the drive hock 15 by the driving power of the motor 141 placed at a preferred position of the vehicle floor. The rear ramp member 72 moves together with the front ramp member 71 by their connected relationship.

Figure 6:
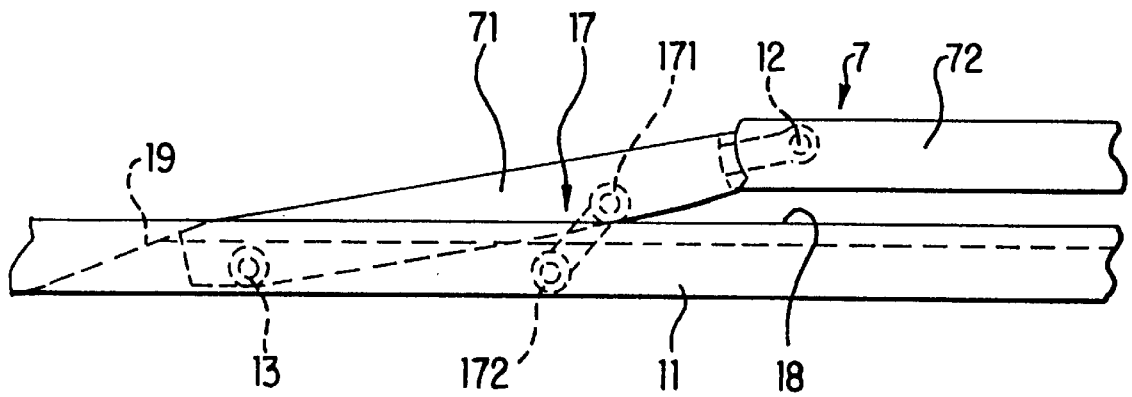
FIG. 6 is a partial enlarged view of the ramp member and a front end portion of a guide rail.

FIG. 6 shows a state in which the ramp member 7 is slightly drawn backward in the guide rail 11. In detail, the front ramp member 71 is drawn back slightly, and accordingly an upper roller 171 of the set of rollers 17 runs on the guide surface 18 by way of a slope portion 19 of the guide surface 18. On the other hand, a lower roller 172 of the set of rollers 17 runs on bottom surface of the guide rail 11 below the guide surface 18. These two rollers 171, 172 function in a manner that they hold the guide surface 18 from both sides and accordingly this makes the front ramp member 71 stable at the inclined position shown in FIG. 6. Furthermore, the rear ramp member 72 connected to this front ramp member 71 is also maintained at a stable position in which it is slightly lifted up as shown in FIG. 6. The reason why the ramp member 7 is lifted up like this is to prevent the rear end of the rear ramp member 72 from contacting a bumper or other members disposed at the rear end of the vehicle when the ramp member 7 moves back. A detailed explanation will be described on this point in accordance with FIGS. 7 and 8.

Figure 7:
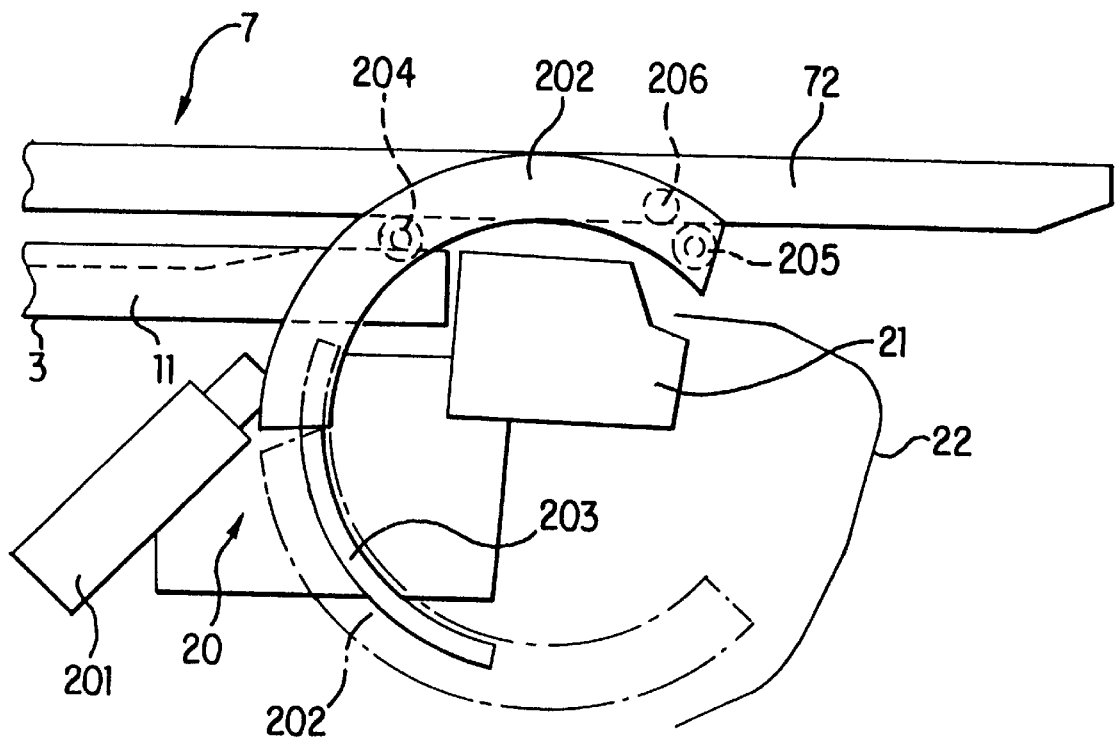
FIG. 7 is a partial enlarged view of the ramp member and a rear end portion of the guide rail.
Figure 8:
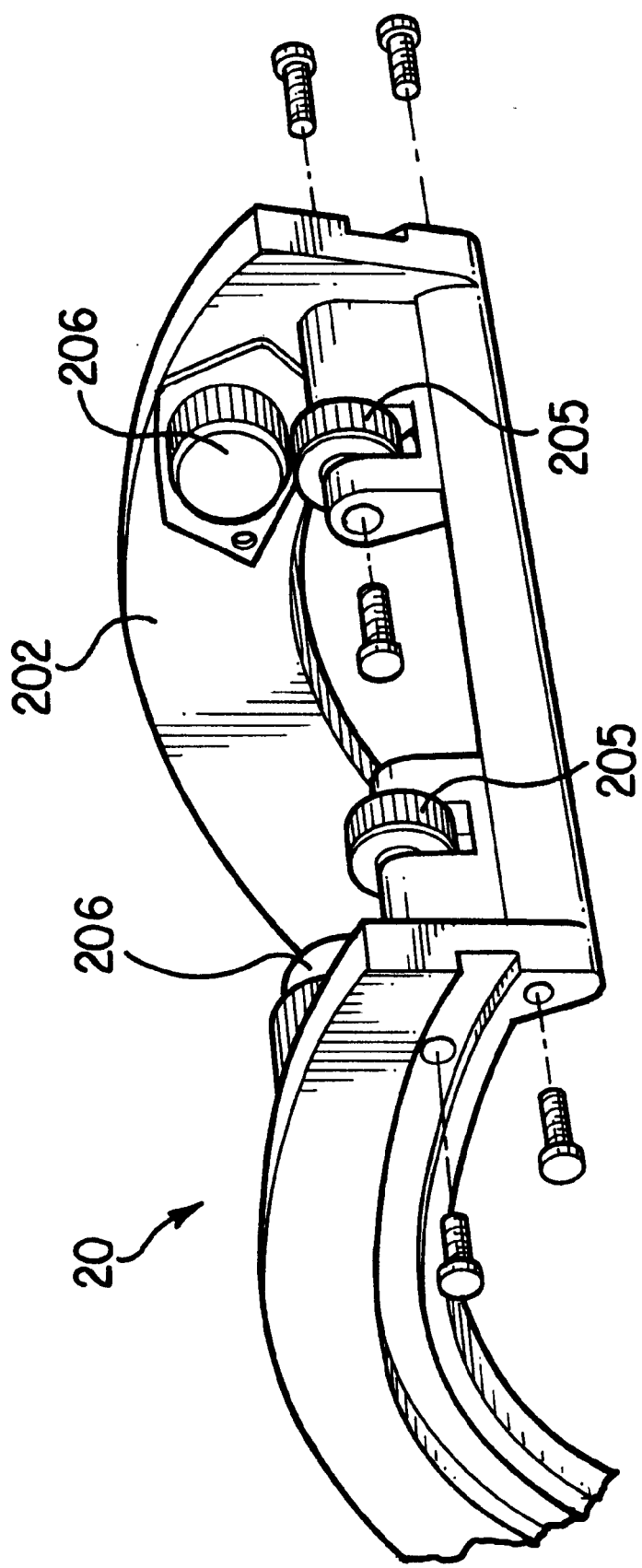
FIG. 8 is a perspective view of a lift mechanism.

FIGS. 7 and 8 show a lift mechanism 20 which is disposed at a rear end of the floor 3 so as to lift up the rear ramp member 72. Numeral 21 denotes a reinforcement member which is disposed at the rear end of the floor panel 3 in a manner so that an upper surface of the reinforcement member is substantially as the same level as an upper surface of the floor panel 3. Numeral 22 shows a rear bumper disposed at the rear end of the vehicle.

The lift mechanism 20 comprises an electric motor 201 mounted on a vehicle body, a rotary lift member 202 which rotates by driving power of the electric motor 201, a supporting rail 203 which rotatably supports the rotary lift member 202 against the vehicle body, and a first bearing 204 and a second bearing 205 mounted on the rotary lift member 202. The solid line in the figure shows a state in which the lift mechanism 20 lifts the rear ramp member 72 upwardly. In this state a lower surface of the rear ramp member 72 is supported by the first bearing 204 and the second bearing 205, and accordingly the ramp member 7 is allowed to move back and forth. on the other hand, the phantom line in the figure shows a state in which the rotary lift member 202 is retracted, and accordingly the ramp member 7 is at a retracted position.

FIG. 8 shows an enlarged detailed structure of the rotary lift member 202 of the lift mechanism 20. Numeral 206 denotes a third bearing which is a ball type bearing and it guides the ramp member 7 by contacting a side surface of the ramp member 7. A groove formed at the sides of the rotary lift member 202, shown in the figure, is engaged with the supporting rail 203 so as to be rotatably guided by the supporting rail 203.

FIGS. 9 through 13 show a series of transitional movement states of the ramp member 7.

FIG. 9 shows the state in which the whole part of the ramp member 7 is retracted in the guide rail 11 and its upper surface is located at the same level as the floor panel 3.

FIG. 10 shows a state in which the ramp member 7 has just started to move back. At first, the rotary lift member 202 of the lift mechanism 20 moves up beyond the reinforcement member 21. Accordingly, the ramp member 7 is allowed to move back beyond the reinforcement member with its rear end being lifted up by the rotary lift member 202.

Figure 11:
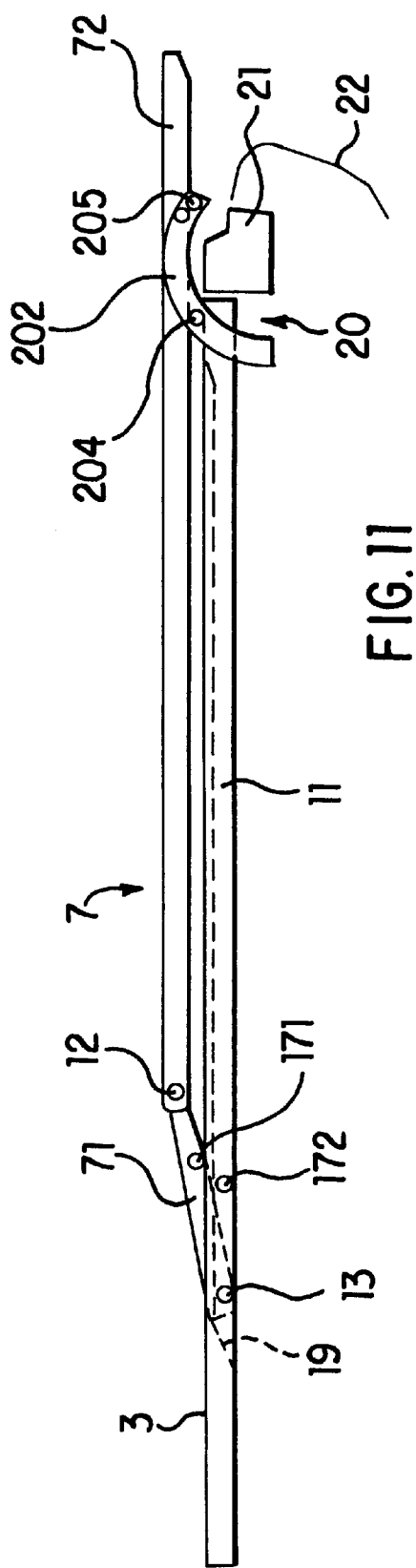

FIG. 11 shows a state in which the ramp member 7 starts to move back horizontally. In this state, the front ramp member 71 is guided by the rollers 171, 172 and the guide surface 18 of the guide rail 11, and has an inclined position as shown in the figure.

Figure 12:
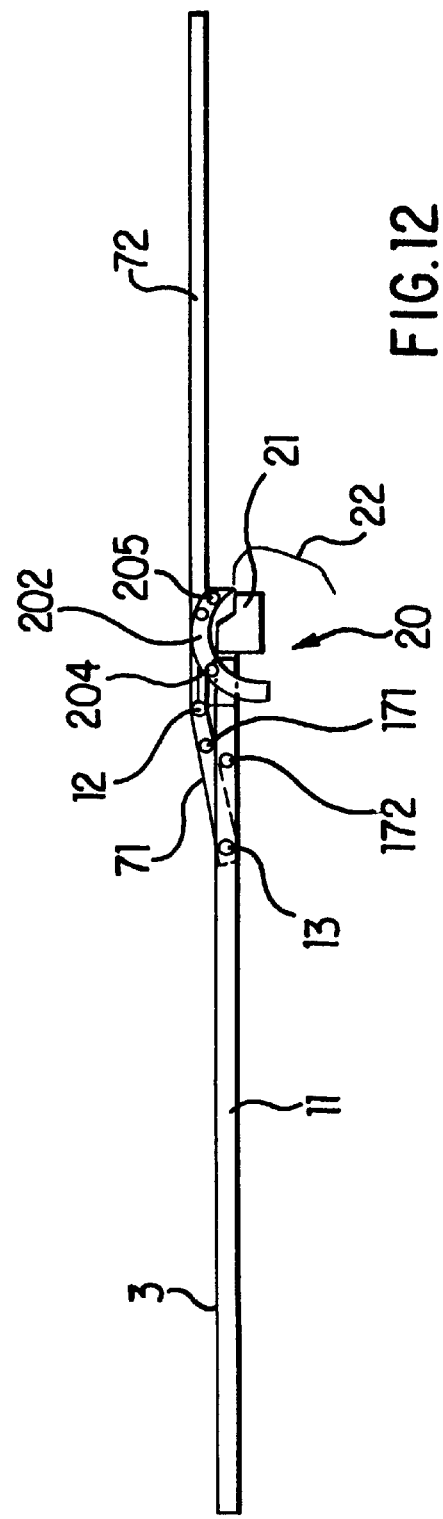

The rear ramp member 72, which is supported by the front ramp member 71 and the lift mechanism 20 at their front and rear ends respectively, moves back to the position shown in FIG. 12 maintaining its horizontal position. Accordingly, the rear seats 5, 6 or other things to be loaded on the rear ramp member 72 can be carried with a stable condition.

Figure 13:
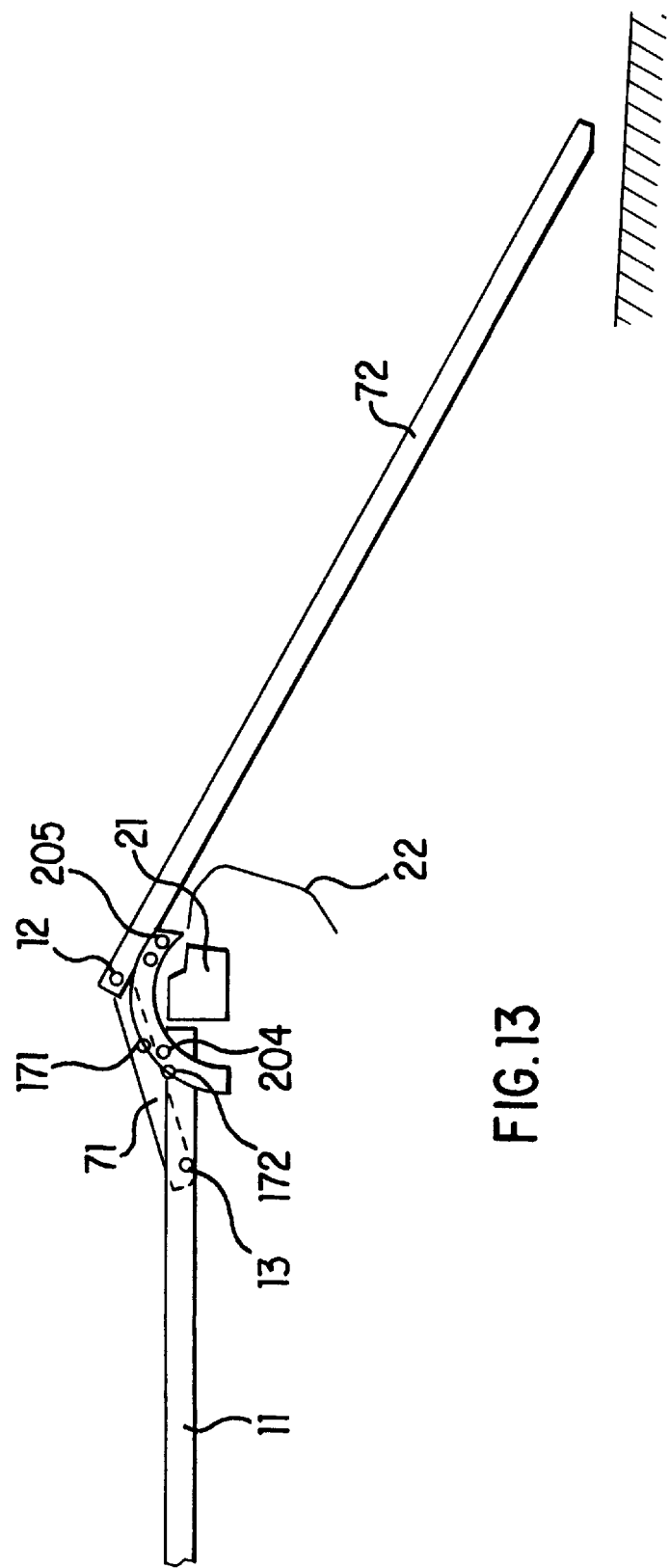

FIG. 13 shows a state in which the ramp member 7 moves back further from the state shown in FIG. 12, and the pivot mechanism 12 connecting the both ramp members 71, 72 reaches the rotary lift member 202. The rear ramp member 72 inclines toward the ground as shown in the figure, and finally the rear end of the ramp member 72 touches the ground after the ramp member 7 moves further back.

Figure 14:
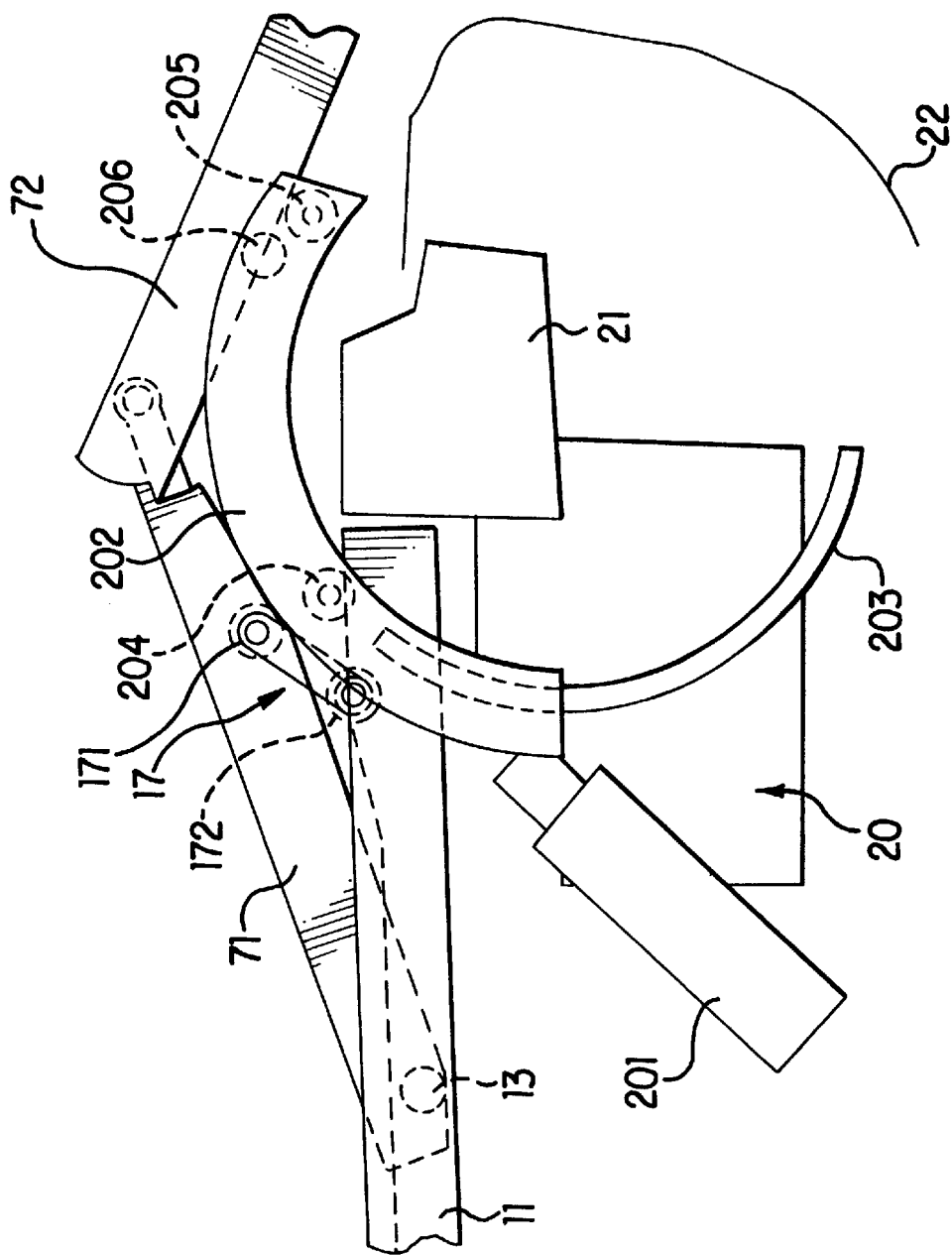
FIG. 14 is an enlarged side view showing the ramp member and the lift mechanism.

FIG. 14 is an enlarged view showing the state of the lift mechanism 20 and the ramp member 7 shown in FIG. 13. The first, second and third bearings 204, 205, 206 contact the front ramp member 71 and the rear ramp member 72 respectively. Accordingly these bearings support the ramp member 7 in a stable condition.

Figure 15:
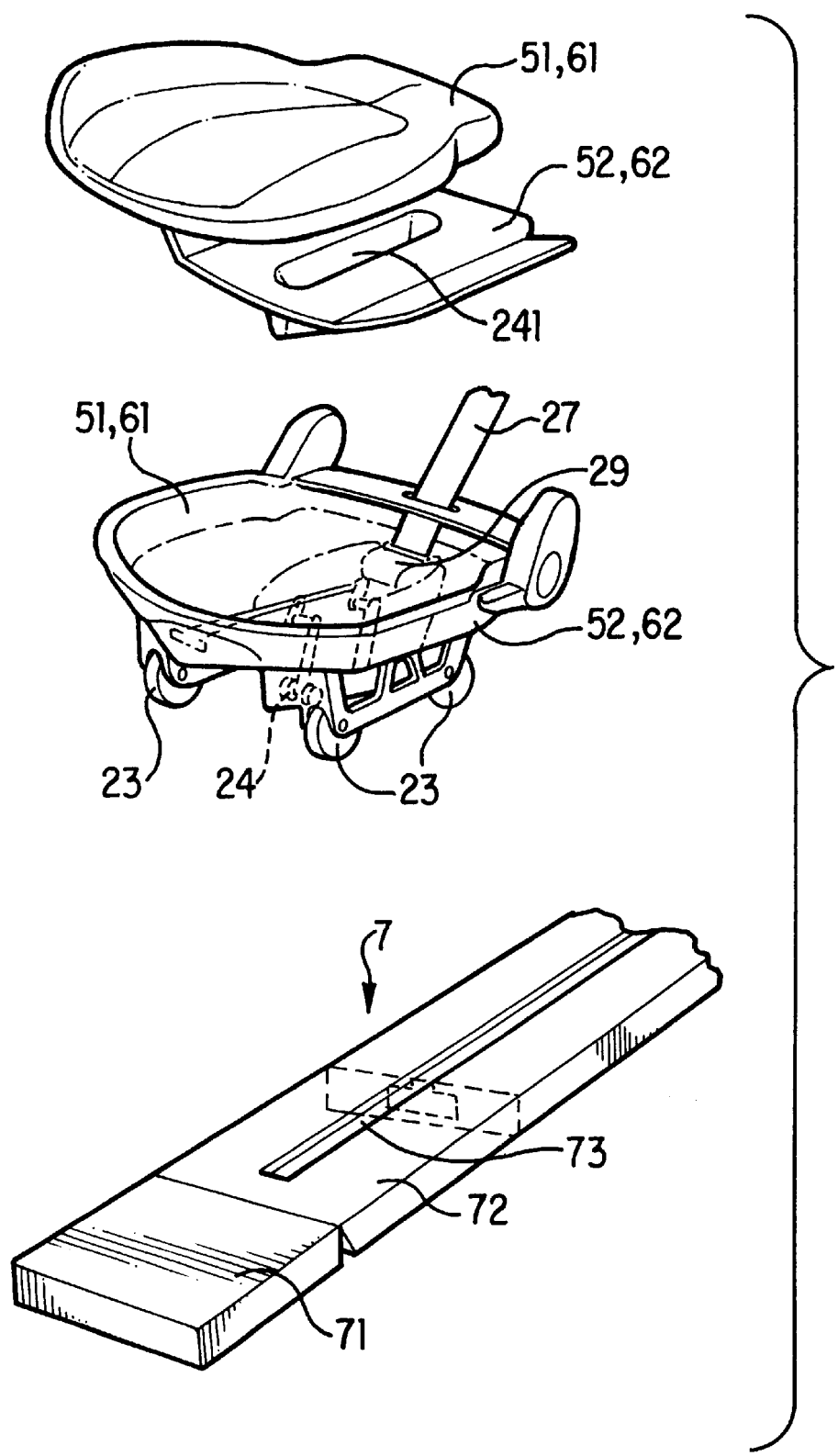
FIG. 15 is a view showing a rear seat and its relationship with the ramp member.
Figure 16:
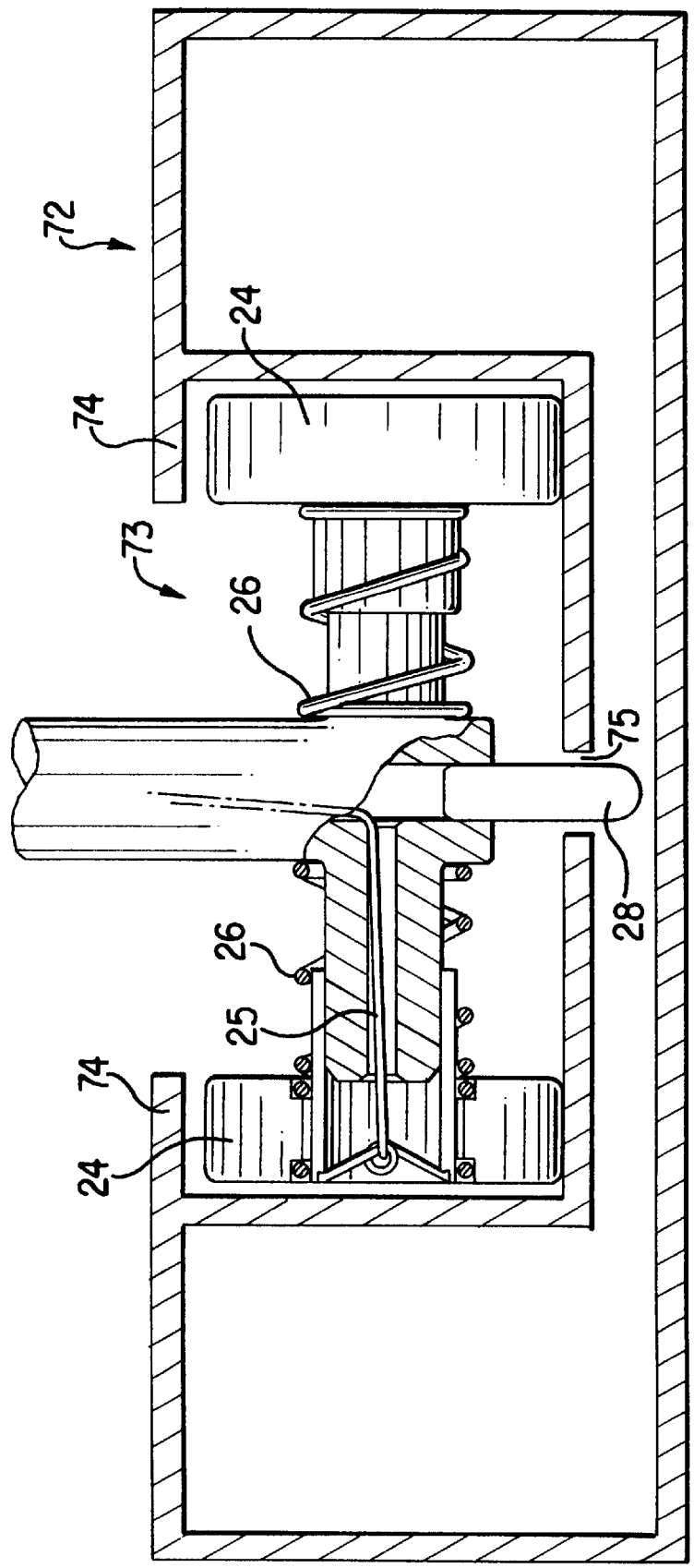
FIG. 16 is a cross-sectional view showing a lock roller disposed within a guide groove of the ramp member.
Figure 19:
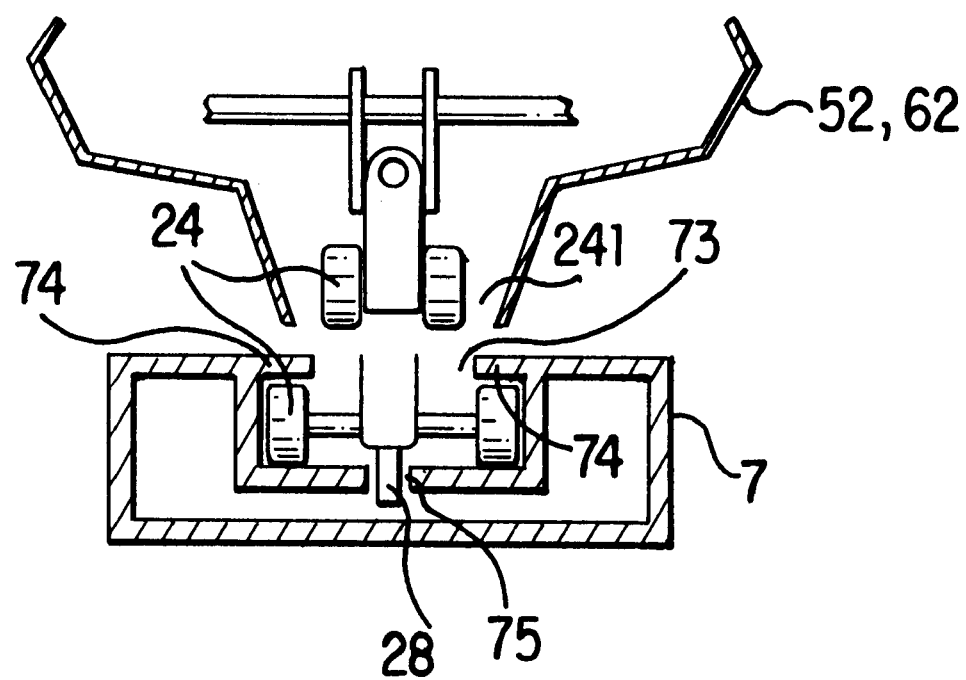
FIG. 19 is a partial sectional view of a rear seat and its relationship with the ramp member showing the rollers in two different positions.

FIGS. 15, 16 and 19 show the attachment of the rear seats 5, 6 to the ramp member 7. In FIG. 15, a seat cushion 51, 61 for the rear seats 5, 6 is shown in states in which the seat cushion is separated from a lower part of the seat. Seat frame 52, 62 disposed below the seat cushion 51, 61 is equipped with a pair of roller legs 23 at both of its sides. The roller legs 23 contact and run on the upper surface of the rear ramp member 72 and, accordingly, they can keep the rear seat stable against the ramp member 7. Additionally, the seat frame 52, 62 has a lock roller 24 at its center for guiding the rear seat and locking the rear seat at a predetermined position against the ramp member 7 in collaboration with a guide groove 73 formed at center of the rear ramp member 72. A detailed explanation about the lock roller 24 will now be described.

As can be seen from FIGS. 16 and 19, the lock roller 24 is arranged so that it has two positions. One position is where it is retracted in an opening 241 formed at the central bottom of the seat frame 52, 62. The other position is where it projects out of the opening 241. Since the lock roller 24 is retracted into the seat frame when the rear seat is removed from the ramp member, it does not prevent stable placement of the removed rear seat on the ground and so on. On the other hand, when the rear seat is attached to the ramp member 7, the lock roller 24 is made to project out of the opening 241 by a preferred operating means (not shown in the figure) and then it is placed within the guide groove 73. The preferred operating means comprises, for example, a link mechanism which connects to the lock roller 24 and is operated by a lever or mechanism operated by a person. By operating the lever, the link mechanism can raise and lower the lock roller 24.

Now, as shown in FIG. 16, both rollers 24, are arranged so that they are spread out by the spring force of a pair of coil springs 26 disposed between both rollers 24 and, on the other hand, a cable 25 is arranged so that it restrains their spread. Therefore, if the cable 25 is released and allows the rollers 24 to spread out by the spring force, the rollers 24 move outwardly to the position shown in FIG. 16, in which the rollers are engaged with stopper member 74. Accordingly, the rear seat is attached to and guided in the ramp member firmly without derailing. Furthermore, a lock pin member 28 is disposed between the rollers 24, and a lock hole 75 is formed at a bottom wall of the rear ramp member 72 at a appropriate place. By an engagement between the lock pin member 28 and the lock hole 75 the rear seat is firmly locked to the ramp member at a predetermined location. This can provide normal and stable placement of the rear seat on the vehicle floor while driving the vehicle.

FIGS. 17 and 18 show the rear seat 5, 6 equipped with seat belt device. Numeral 29 denotes a seat belt retractor fixed to the seat frame 52, 62. Numeral 27 denotes a seat belt for the rear seat. In this seat, the seat belt 27 can be selectively locked at both of the seat belt anchors 54, 64 which are formed on both sides of the seat. This arrangement is preferred if the rear seat is attached to any ramp members 7 which are placed in parallel as shown in FIG. 1. The seat belt retractor 29 is also mounted on the center of the seat for this embodiment.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A rear seat attachment apparatus for a vehicle having a rear lid covering a rear part of a vehicle compartment, in which a rear seat is disposed on a floor panel of the rear part of the vehicle compartment, comprising:

a guide member disposed on the floor panel;

a ramp member guided by said guide member so as to move adjacent to the floor panel in a longitudinal direction of vehicle, wherein the ramp member has a retracted position in the vehicle compartment and an extended position extending from the vehicle compartment; and a rear seat attached detachably to said ramp member.

2. A rear seat attachment apparatus for a vehicle according to claim 1, wherein the ramp member includes a guide rail disposed in the longitudinal direction of the vehicle and the rear seat is equipped with a leg portion having a slide member, the slide member is engaged with the guide rail so that the rear seat slides and moves on the ramp member in the longitudinal direction of the vehicle.

3. A rear seat attachment apparatus for a vehicle according to claim 1, wherein a pair of the ramp members are disposed on both sides of the vehicle floor and the ramp members are arranged so that they move independently of the vehicle floor.

4. A rear seat attachment apparatus for a vehicle according to claim 1, wherein the ramp member is driven by a drive actuator through a connection member, the connection member is connected with the ramp member by a coupling device.

5. A rear seat attachment apparatus for a vehicle according to claim 1, wherein the apparatus further includes a reinforcement member which is disposed at a rear end of the floor panel and projects from the floor panel, and a lift mechanism for guiding and lifting the ramp member so that the ramp member moves back beyond the reinforcement member while being drawn out of the vehicle compartment.

6. A rear seat attachment apparatus for a vehicle according to claim 2, wherein said slide member disposed at the seat leg portion comprises a roller member and a lock member so that the rear seat is guided detachably and locked to the guide rail of the ramp member.

7. A rear seat attachment apparatus for a vehicle according to claim 1, wherein the ramp member comprises a front ramp member and a rear ramp member, the front and rear members being connected to each other by a pivot connection.

8. A rear seat attachment apparatus for a vehicle according to claim 1, wherein the rear seat is equipped with a seat belt retractor at a center thereof and a pair of seat belt anchors at both shoulder portions of the rear seat.

* * * * *